US012715509B1

(12) United States Patent
Cao et al.

(10) Patent No.: US 12,715,509 B1
(45) Date of Patent: Aug. 25, 2026

(54) METHODS AND APPARATUS FOR STANDSTILL STEERING CONTROL

(71) Applicant: Ford Global Technologies, LLC, Dearborn, MI (US)

(72) Inventors: Bang Kim Cao, Northville, MI (US); Jonathan Craig Sullivan, Ferndale, MI (US); Matthew Meyerholtz Johnson, Toledo, OH (US); David Gon Oh, Canton, MI (US); Sage Aaron Stubbs, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 19/064,291

(22) Filed: Feb. 26, 2025

(51) Int. Cl.

*B62D 15/02* (2006.01)
*B60K 35/21* (2024.01)
*B60K 35/28* (2024.01)

(52) U.S. Cl.

CPC ............ *B62D 15/025* (2013.01); *B60K 35/21* (2024.01); *B60K 35/28* (2024.01); *B60K 2360/167* (2024.01)

(58) Field of Classification Search

CPC ...... B62D 15/025; B60K 35/21; B60K 35/28; B60K 2360/167
See application file for complete search history.

(56) References Cited

U.S. PATENT DOCUMENTS 8,275,517 B2 * 9/2012 Campo ................ B62D 5/0466 180/443
9,950,734 B2 * 4/2018 Bebernes ............... B62D 5/087
11,440,586 B2 * 9/2022 Engels .................. B60W 30/06
2008/0275608 A1 * 11/2008 Campo ................ B62D 5/0466 701/41
2015/0158524 A1 * 6/2015 Lee ........................ B62D 6/001 701/41
2018/0273092 A1 * 9/2018 Engels ............... B62D 15/0285
2025/0128760 A1 * 4/2025 Das ..................... B60W 60/001

* cited by examiner

*Primary Examiner* — Sizo B Vilakazi
(74) *Attorney, Agent, or Firm* — Lorne Forsythe; Hanley, Flight & Zimmerman, LLC

(57) ABSTRACT

Methods and apparatus for standstill steering control are disclosed. A disclosed example apparatus includes interface circuitry communicatively coupled to a road wheel actuator (RWA) and a steering torque sensor corresponding to a spring-to-center steering wheel of a vehicle, machine-readable instructions, and at least one processor circuit to be programmed by the machine-readable instructions to determine that the vehicle is moving at or below a threshold speed and a brake of the vehicle is being applied, and maintain, based on the determination, a steering angle of the RWA when a degree of torque applied to the steering torque sensor is less than or equal to a threshold degree of torque.

20 Claims, 9 Drawing Sheets

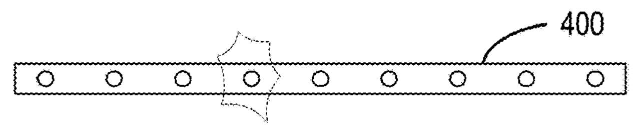
FIG. 4A
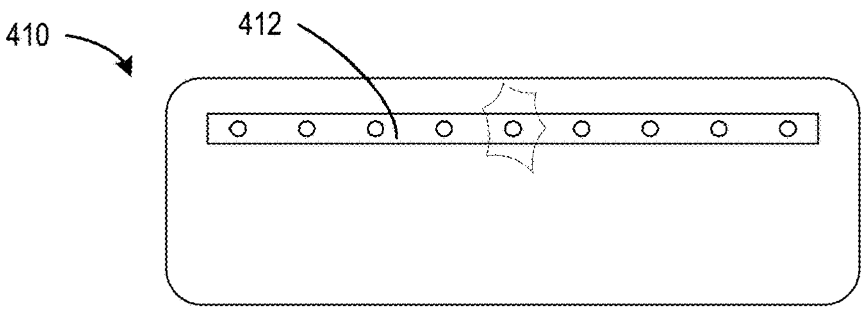
FIG. 4B
420
424
428
430
422
426
430
FIG. 4C
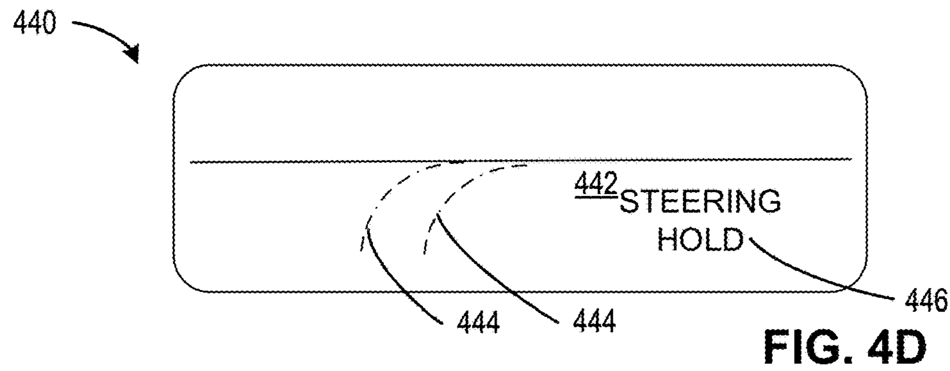
FIG. 4D

METHODS AND APPARATUS FOR STANDSTILL STEERING CONTROL

FIELD OF THE DISCLOSURE

This disclosure relates generally to vehicles and, more particularly, to methods and apparatus for standstill steering control.

BACKGROUND

A spring-to-center steering wheel for a steer-by-wire system can offer a unique experience for driving a vehicle. In particular, a road wheel actuator (RWA) controls movement of a steering assembly (e.g. a steering rack, a pitman arm, a recirculating ball, or an individual steering actuator, etc.) while the spring-to-center steering wheel is utilized for control of the RWA. In a conventional steering system, the steering wheel can remain in an angular orientation upon being released by the driver when the vehicle is stopped and, thus, the wheels of the vehicle remain stationary.

SUMMARY

An example apparatus includes interface circuitry communicatively coupled to a road wheel actuator (RWA) and a steering torque sensor corresponding to a spring-to-center steering wheel of a vehicle, machine-readable instructions, and at least one processor circuit to be programmed by the machine-readable instructions to determine that the vehicle is moving at or below a threshold speed and a brake of the vehicle is being applied, and maintain, based on the determination, a steering angle of the RWA when a degree of torque applied to the steering torque sensor is less than or equal to a threshold degree of torque.

An example of non-transitory machine-readable medium includes machine-readable include instructions to cause at least one processor circuit to at least predict an intent of a user of a vehicle at least partially based on (i) a speed of the vehicle, and (ii) an application of a brake, hold a steering angle of a road wheel actuator (RWA) based on the predicted intent indicating to hold the steering angle when a degree of torque applied to a steering torque sensor of a spring-to-center steering wheel is released, and cause a human machine interface (HMI) to display information corresponding to the steering angle as the steering angle is held.

An example method of operating a steer-by wire system of a vehicle includes determining, by executing instructions with at least one processor, that (i) the vehicle is travelling at or below a threshold speed, and (ii) a brake of the vehicle is being applied, and maintaining, by executing instructions with the at least one processor, the steering angle of a RWA based on the determination and a degree of torque applied to a steering torque sensor being less than or equal to a threshold degree of torque.

BRIEF DESCRIPTION OF THE DRAWINGS

FIGS. 4A-4D depict example interfaces that can be implemented in examples disclosed herein.

Figure 1:
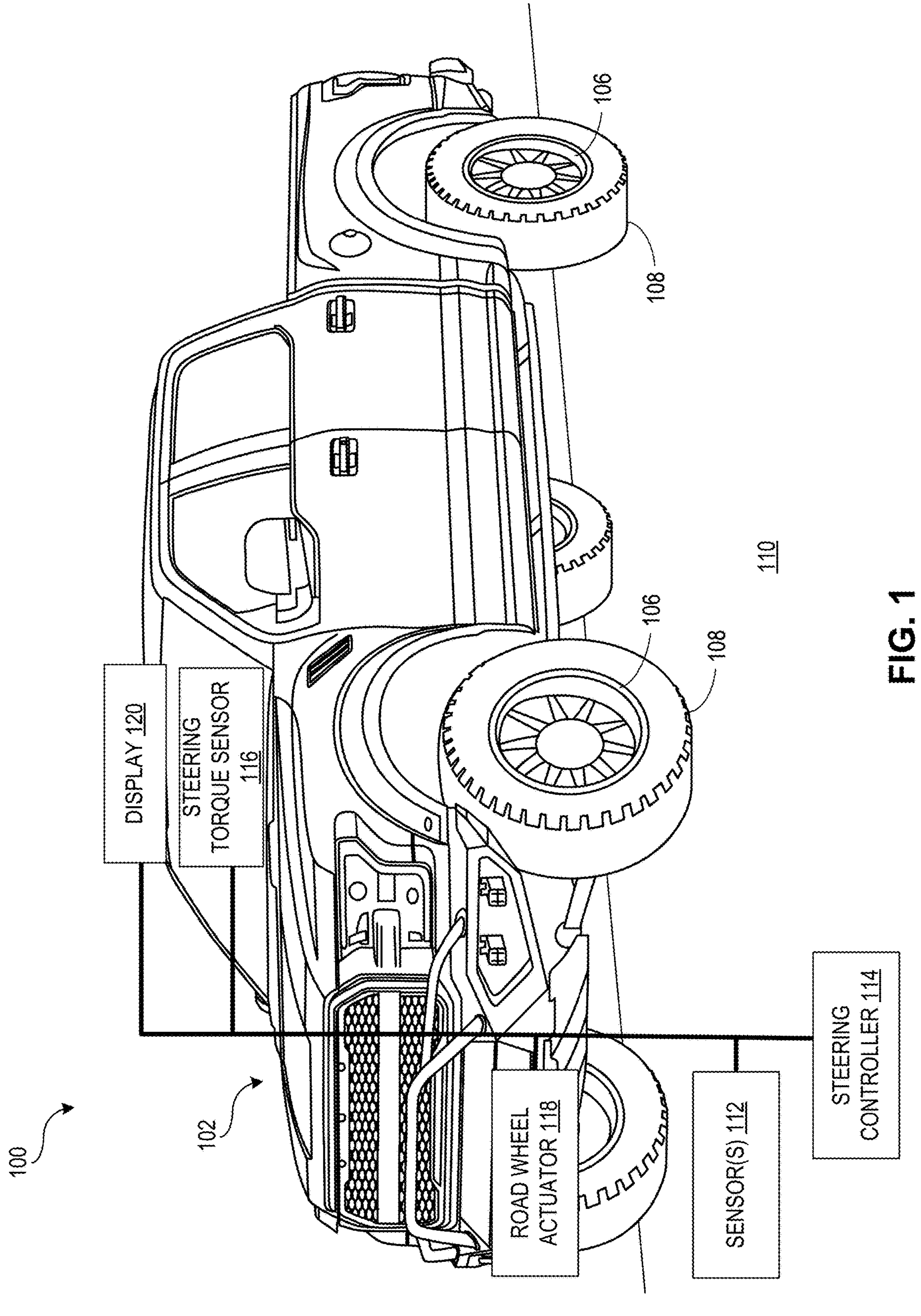
FIG. 1 illustrates an example vehicle in which examples disclosed herein can be implemented.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Methods and apparatus for standstill steering control are disclosed. Steer-by-wire systems of a vehicle typically utilize a road wheel actuator (RWA) that controls movement of a steering actuator while a hand wheel actuator (HWA) receives input from a user and, in turn, provides feedback to the user. The feedback can include, but is not limited to, a rotational resistance and/or torque via a steering wheel. Steer-by-wire systems are distinct from conventional steering systems such that the RWA and the HWA are coordinated and/or operated together based on software and/or hardware logic.

A spring-to center steer-by-wire system utilizes a steering wheel that is distinct from a conventional steering wheel such that less rotational displacement is encountered. In such systems, the spring-to-center steering wheel utilizes a steering torque sensor that measures an applied torque to the spring-to-center steering wheel. In turn, the steering torque sensor is communicatively coupled to an RWA. Particularly, torque applied to the steering torque sensor via the spring-to-center steering wheel is communicated to the RWA for control of a steering angle.

Accordingly, examples disclosed herein can advantageously predict an intent of the user to effectively control the operational relationship between the RWA and the steering torque sensor associated with a spring-to-center steering wheel. As a result, examples disclosed herein can enhance the experience of the user by adapting steering control based on sensor data/output as well as input from the user provided to a steering wheel or other input device associated with the vehicle.

Examples disclosed herein utilize an algorithm that defines spring-to-center steering system behavior based on at least one vehicle condition in conjunction with driver input, such as when an operator/driver releases torque on the steering wheel at a vehicle standstill (e.g., waiting at a stop light to make a turn with some initial steering input and then releasing the steering input). According to examples disclosed herein, road wheels are held/maintained to be oriented and/or turned with respect to a last command from the user based on a determined and/or predicted intent of the user. In particular, examples disclosed herein utilize control logic such that the RWA can be held to a steering angle even with a reduced amount of torque applied to the steering wheel and, thus, the RWA is prevented from return-to-center behavior (of base spring-to center steering wheel to RWA control logic).

Examples disclosed herein utilize a condition of a vehicle, such as a vehicle speed, to predict and/or determine an intent of the user for control of a spring-to-center steering system (or other logic-based steering implementation). To that end, examples disclosed herein can prevent return-to-center behavior (typical of a spring-to-center steering implementation) when the user has released the steering wheel. For example, when sensor output indicates that the vehicle is travelling at or below a threshold speed (e.g., the vehicle reaches a standstill) and a brake system is applied, a position (e.g., an angular position) of a RWA known as a steering angle or steering position can be held/maintained when torque applied by the user to the steering wheel and, in turn, a steering torque sensor is at or below a threshold degree of torque (e.g., torque is fully released from the steering wheel). In other words, examples disclosed herein utilize various parameters/conditions to predict an intent of the user (e.g., to predict whether the user intends to hold a steering angle) to control operation of the RWA. Examples disclosed herein display information corresponding to the steering angle so that the user can be aware of the steering angle even when releasing applied torque to the steering wheel.

According to some examples disclosed herein, the user is prompted/queried as to whether to hold the steering angle. In some such examples, the user can confirm whether to hold the steering angle of the RWA via a button, switch or other input or toggling device (e.g., even after releasing the steering wheel). Additionally or alternatively, a human machine interface (HMI), such as a display having an array of light sources, is utilized to convey information to the user corresponding to the steering angle and/or whether the steering angle is being held (e.g., being held against centering behavior). The HMI may include a linearly arranged grouping of light emitting diodes (LEDs), for example. In some examples, the HMI includes a panel display (e.g., a screen panel, a touchscreen display, etc.). Additionally or alternatively, haptic feedback, such as vibration of a steering wheel or other vehicle component, is utilized to convey whether the steering angle is being held or to prompt the user to confirm that the steering angle is to be held or maintained.

As used herein, the term "determine" encompasses calculations or other manners of obtaining numerical values having a finite degree of precision and, thus, are not necessarily exact and may, for example, be estimates.

FIG. 1 illustrates an example vehicle 100 in which examples disclosed herein can be implemented. The example vehicle 100 utilizes sensor data/output to monitor vehicle systems (e.g., steering systems, brake systems, tires, etc.). In particular, examples disclosed herein utilize sensor data/output in conjunction with user input for prediction and/or determination of an intent of a user (e.g., a driver, an operator, etc.) for control of a steer-by-wire system, for example.

The vehicle 100 of the illustrated example includes a body 102 supporting a plurality of wheels 106 to which tires 108 are coupled. In turn, the tires 108 are in contact with a road surface 110. The example vehicle 100 includes at least one sensor (e.g., a steering angle sensor, a rack position sensor, etc.) 112 that may be used to determine a steering angle of the tires 108 and/or the wheels 106. Further, the example vehicle 100 includes a steering controller 114, a steering torque sensor 116, an RWA 118 and an HMI (e.g., a user interface, a display, etc.) 120.

As will be discussed below in connection with FIGS. 1-9, examples disclosed herein enable effective control of the RWA 118 based on vehicle conditions as well as input provided to the steering torque sensor 116 based on loading and/or displacement of the spring-to-center steering wheel. In particular, examples disclosed herein can predict an intent of the user with respect to maintaining/holding a steering angle of the RWA 118 under predefined conditions. According to examples disclosed herein, in response to the vehicle 100 travelling at a speed below a threshold speed (e.g., a of speed approximately zero, a braking speed, the vehicle 100 is at a standstill, a near stopping speed, etc.) and a brake system of the vehicle 100 being applied, the steering angle can be maintained when a torque from the user applied to the spring-to-center steering wheel (and the steering torque sensor 116) is below or equal to a threshold torque (e.g., little or no torque is applied to the steering torque sensor 116 via the steering wheel). Additionally or alternatively, the steering angle is maintained with a change (e.g., a rapid decrease) in torque (e.g., an applied torque) to the steering torque sensor 116 via the spring-to-center steering wheel.

Figure 2:
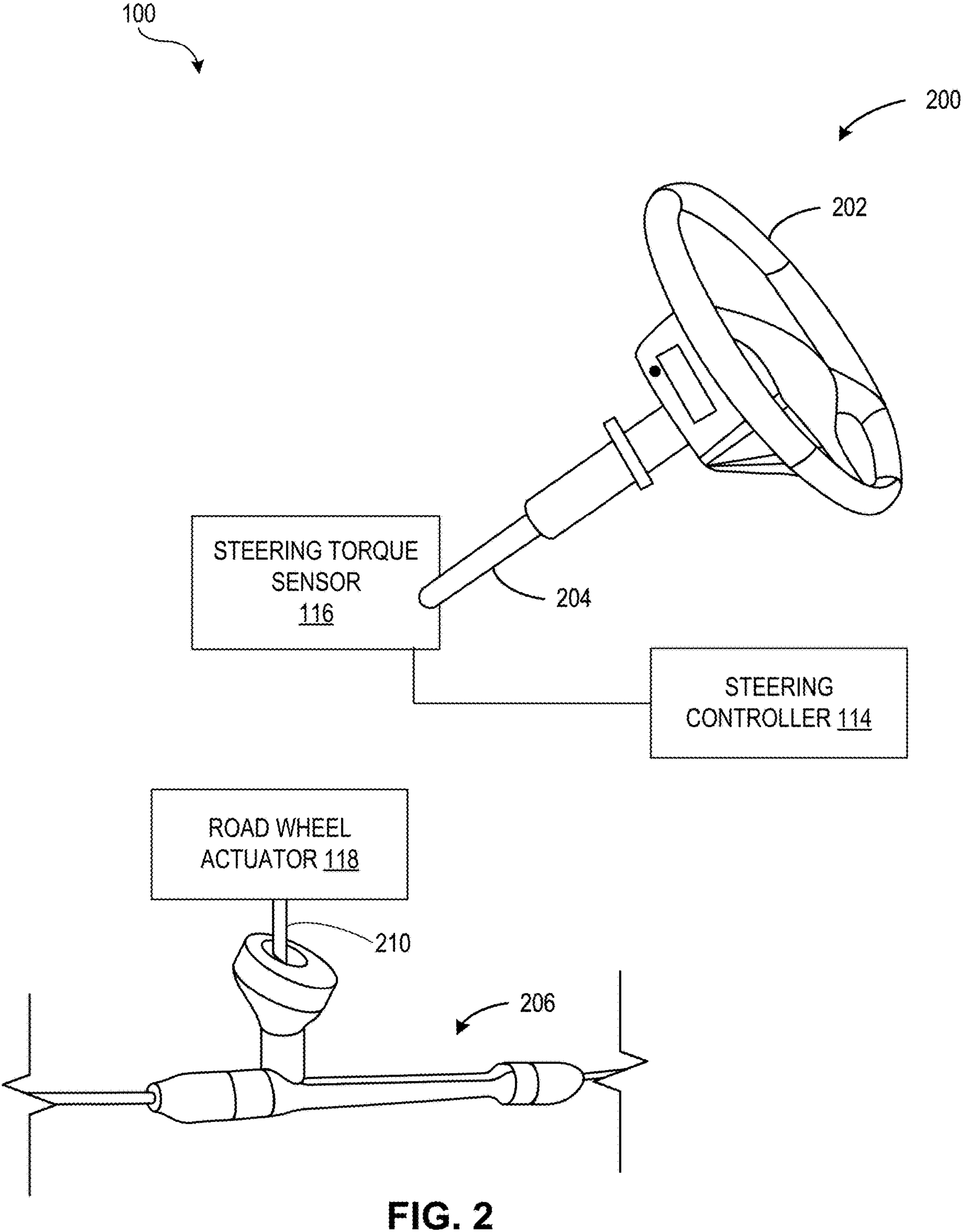
FIG. 2 illustrates an example steering system of the example vehicle of FIG. 1.

FIG. 2 illustrates an example steering system 200 of the example vehicle 100 of FIG. 1. In the illustrated example of FIG. 2, the steering system 200 includes the steering controller 114, the steering torque sensor 116, the RWA 118, a steering wheel (e.g., a spring-to-center steering wheel) 202, a steering wheel shaft 204, a steering assembly (e.g., a steering rack and pinion system, a steering rack assembly, etc.) 206, and a steering input (e.g., a steering shaft) 210. The example steering assembly 206 is coupled to the wheels 106 of the vehicle 100 shown in FIG. 1.

The steering wheel 202 is coupled to the steering shaft 204 and allows a user of the vehicle 100 to operate the RWA 118 and thereby steer the vehicle 100. To that end, the steering controller 114 is in communication with the RWA 118. For example, the steering controller 114 includes a transceiver (e.g., a wireless or wired transceiver) that is in communication with a transceiver (e.g., a wireless or wired transceiver) of the RWA 118. Accordingly, the steering controller 114 can transmit driver input (e.g., torque applied to the steering wheel 202) from the steering wheel 202 as steering control signals (e.g., steering commands) to the RWA 118 and the steering controller 114 can receive vehicle handling feedback from the RWA 118. In this example, as the user turns the steering wheel 202, the rotational torque of the steering wheel 202 is transferred through the steering shaft 204 to the steering torque sensor 116. In some examples, the steering controller 114 may receive the vehicle handling feedback from a plurality of sensors equipped to the vehicle 100. The plurality of sensors may include anti-lock braking system (ABS) module sensors, wheel speed sensors, wheel angle sensors, etc.

In the illustrated example of FIG. 2, the steering torque sensor 116 senses steering input torque) of the steering shaft 204 and generates corresponding signals representative of commanded rotational positions of the RWA 118. Accordingly, the signals generated by the steering torque sensor 116 can be utilized by the steering controller 114 to transmit steering control signals to the RWA 118. In addition to determining steering angles of the steering wheel 202, in some examples, the steering torque sensor 116 and/or the associated steering angle sensor may be used to derive other steering-related metrics such as steering velocity, steering acceleration, steering torque, etc.

In operation, the example steering assembly 206 includes a linear actuator and a pinion engaged with a rack. The example steering assembly 206 translates rotational inputs from the RWA 118 into linear motion to steer the wheels 108 shown in FIG. 1. In this manner, a user operating the steering wheel 202 causes the steering assembly 206 to change a direction of the vehicle 100 by steering the wheels 108. According to examples disclosed herein, the RWA 118 includes a rotation sensor that can be coupled to the steering input 210 which, in turn, is coupled to the steering assembly 206. In some such examples, the RWA 118 can utilize the aforementioned rotation sensor to detect road-wheel feedback (e.g., vehicle handling feedback) from the wheels 108 and communicate that road-wheel feedback to the steering controller 114 so that the steering controller 114 can provide the feedback to the user via the HMI 120 or through vibrational/haptic feedback of the steering wheel 202.

Because the steering torque sensor 116 and the RWA 118 are not physically coupled to transfer mechanical motion therebetween (as in a conventional system), examples disclosed herein utilize logic to control a steering angle of the steering assembly 206 based on analyzing at least one condition of the vehicle 100 in conjunction with input (e.g., input torque, a presence of an input torque, etc.) provided to the steering wheel 202 and, thus, the steering torque sensor 116 (e.g., as torque applied to the steering torque sensor 116). In other words, examples disclosed herein utilize logic to predict an intent of the user with respect to operation of the steering assembly 206.

Figure 3:
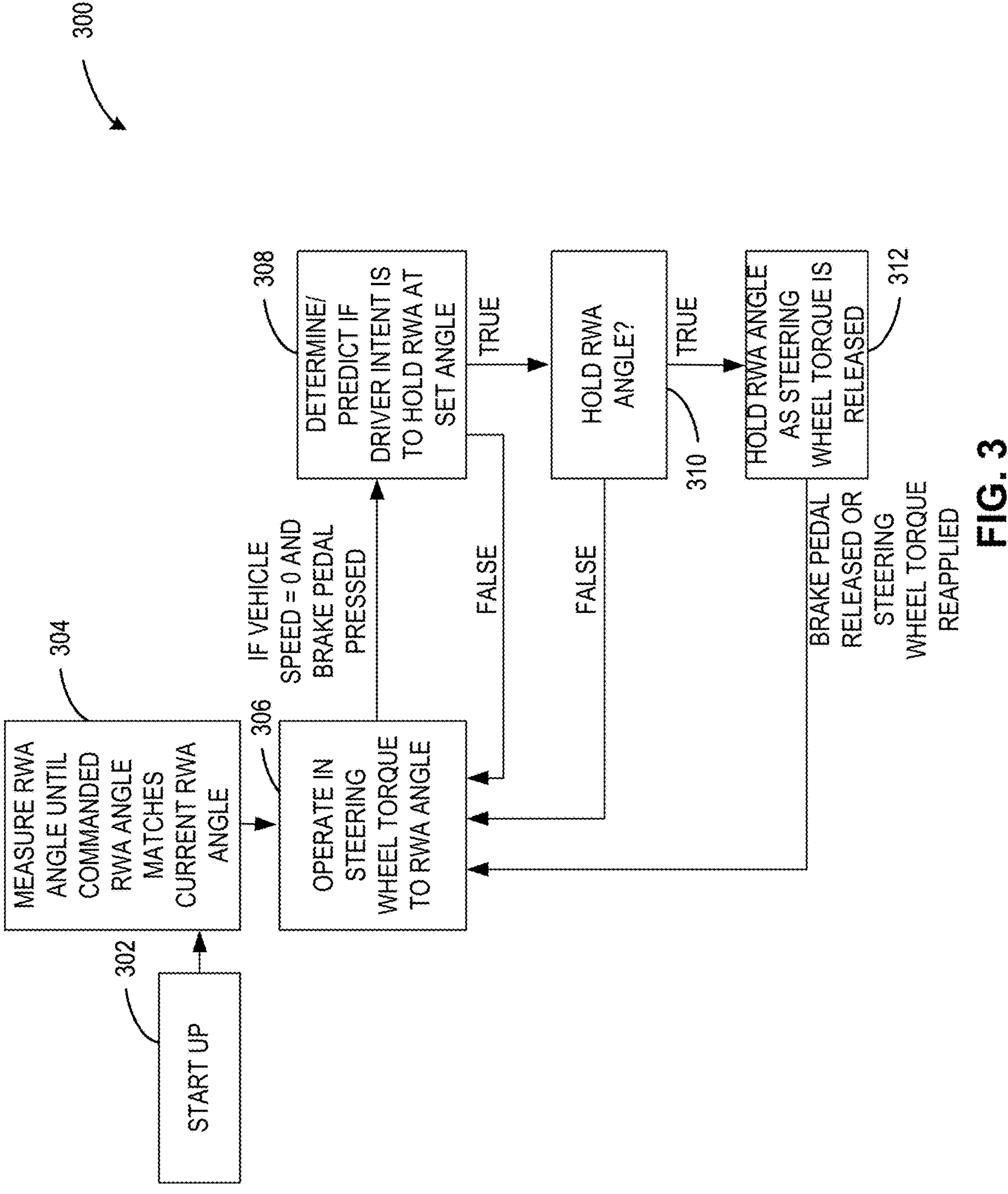
FIG. 3 illustrates an example process flow in accordance with teachings of this disclosure.

FIG. 3 illustrates an example process flow 300 in accordance with teachings of this disclosure. According to examples disclosed herein, block 302 corresponds to a start up of a vehicle, such as the vehicle 100 shown in FIG. 1. In this example, the start up corresponds to operating and/or driving the vehicle.

At block 304, an RWA angle and steering wheel torque is measured until a commanded RWA angle matches a current RWA angle. In particular, the measured/monitored RWA angle along with commanded RWA data from a steering torque sensor (e.g., the steering torque sensor 116) is monitored and/or measured until the commanded RWA angle and the current RWA angle are sufficiently close to one another.

At block 306, during operation of the steering system of the vehicle, torque applied to the steering wheel is utilized to control the RWA. According to some examples disclosed herein, the RWA is controlled based on the torque applied to the steering wheel via a model, such as a model in which torque is converted to an angle as a function of a speed of the vehicle, for example.

At block 308, examples disclosed herein estimate, predict and/or determine an intent of the user (to hold the RWA at a set angle/steering angle) based on at least one condition of the vehicle (e.g., speed, acceleration, deceleration, turning, engine utilization) in conjunction with input from the user (e.g., a force applied to or released from a steering wheel, an application or release of a brake system, toggling a switch, etc.). In this example, a condition can correspond to the vehicle speed being approximately zero (e.g., the vehicle is at a standstill), and an input corresponds to the brake system being applied (e.g., a brake pedal is partially pressed, the brake pedal is fully pressed, etc.). However, any other appropriate conditions and/or user inputs can be utilized instead.

At block 310, in some examples, the user is prompted as to whether to hold and/or maintain the steering angle (e.g., despite releasing the steering wheel and/or applying and releasing applied torque to the steering wheel). In particular, the user can be prompted to forego standard spring-to-center steering wheel logic, for example. According to examples disclosed herein, the user can be provided with information on an HMI/display or haptic signals, for example, as to whether to maintain/hold a position of the RWA and, thus, the steering angle. The information can correspond to a center console prompt (e.g., a prompt on a center console screen) such that a button or other input is utilized by the user to confirm holding and/or maintaining the steering angle. In some examples, an information cluster prompt on the steering wheel is utilized where a button on the steering wheel may be implemented for confirmation by the user. Additionally or alternatively, a vibration (e.g., a haptic vibration, a steering wheel vibration, etc.) or blinking light source, such as a blinking LED, is utilized to convey information to the user (e.g., to prompt the user as to whether the steering angle is to be held/maintained, whether torque applied to the steering torque sensor is released, the steering angle is being held, etc.). For example, blinking light sources can be utilized for indication of whether the steering angle is being maintained/held and/or to prompt the user as to whether the steering angle is to be maintained/held.

At block 312, the steering angle is held while a degree of torque applied to the steering wheel by the user is at or below a threshold degree of torque (e.g., the torque applied to the steering wheel is released), which can be counter-intuitive for a steer-by-wire system with a spring-to-center steering wheel. As a result, a return-to-center movement is prevented. However, holding the steering angle of the RWA may be ceased based on at least one of the brake system being released, or a torque being reapplied to the steering wheel, for example.

In some examples, the steering angle can be held in a parking scenario (e.g., uphill parking, downhill parking). In some such examples, the steering angle is held to enable a tire or wheel of the vehicle to be held against a curb, for example, even with the applied torque released from the steering wheel.

FIGS. 4A-4D depict example interfaces (e.g., HMIs) that can be implemented in examples disclosed herein. Turning to FIG. 4A, an example light array 400 is shown. According to examples disclosed herein, the light array 400 includes a linearly arranged array of light sources, such as LEDs for example. In the illustrated example of FIG. 4A, one or more of the light sources being illuminated indicates a steering angle to a user. In other examples, a display panel (e.g., a screen, a monitor, a display panel, a head-up display (HUD), etc.) is utilized to indicate the steering angle to the user. For example, the steering angle can be indicated to the user to inform the user that spring-to-center steering behavior is being overridden (e.g., via control logic).

FIG. 4B depicts an example display (e.g., instrument panel, console display, etc.) 410 with a light array 412. According to examples disclosed herein, the light array 412 indicates a steering angle based on one or light sources (e.g., display pixels) thereof being illuminated. For example, some of the light sources may be illuminated to indicate a degree to which the RWA has the wheels turned and/or rotated (e.g., a turning angle of wheels).

Turning to FIG. 4C, a steering wheel 420 is shown. In this example, a wheel portion 422 of the steering wheel 420 may have a light pattern array 424 for indication of a steering angle. Additionally or alternatively, a center portion 426 of the steering wheel 420 may include a light pattern array 428 for indication of the steering angle. In some examples, a button or switch 430 is implemented for the user to confirm or instruct holding the steering angle.

FIG. 4D depicts a display 440 that may project and/or display a scene (e.g., a scene captured by an image sensor) 442 with lines or curves 444 depicting a pathway of a vehicle based on a steering position. In some examples, text 446 may indicate that the steering angle is being held even without an applied torque and/or a decrease in torque applied to the steering wheel and, thus, a steering torque sensor corresponding to the steering wheel. Any combination of aspects of the examples disclosed herein in FIGS. 4A-4D can be implemented in combination with one another.

Figure 5:
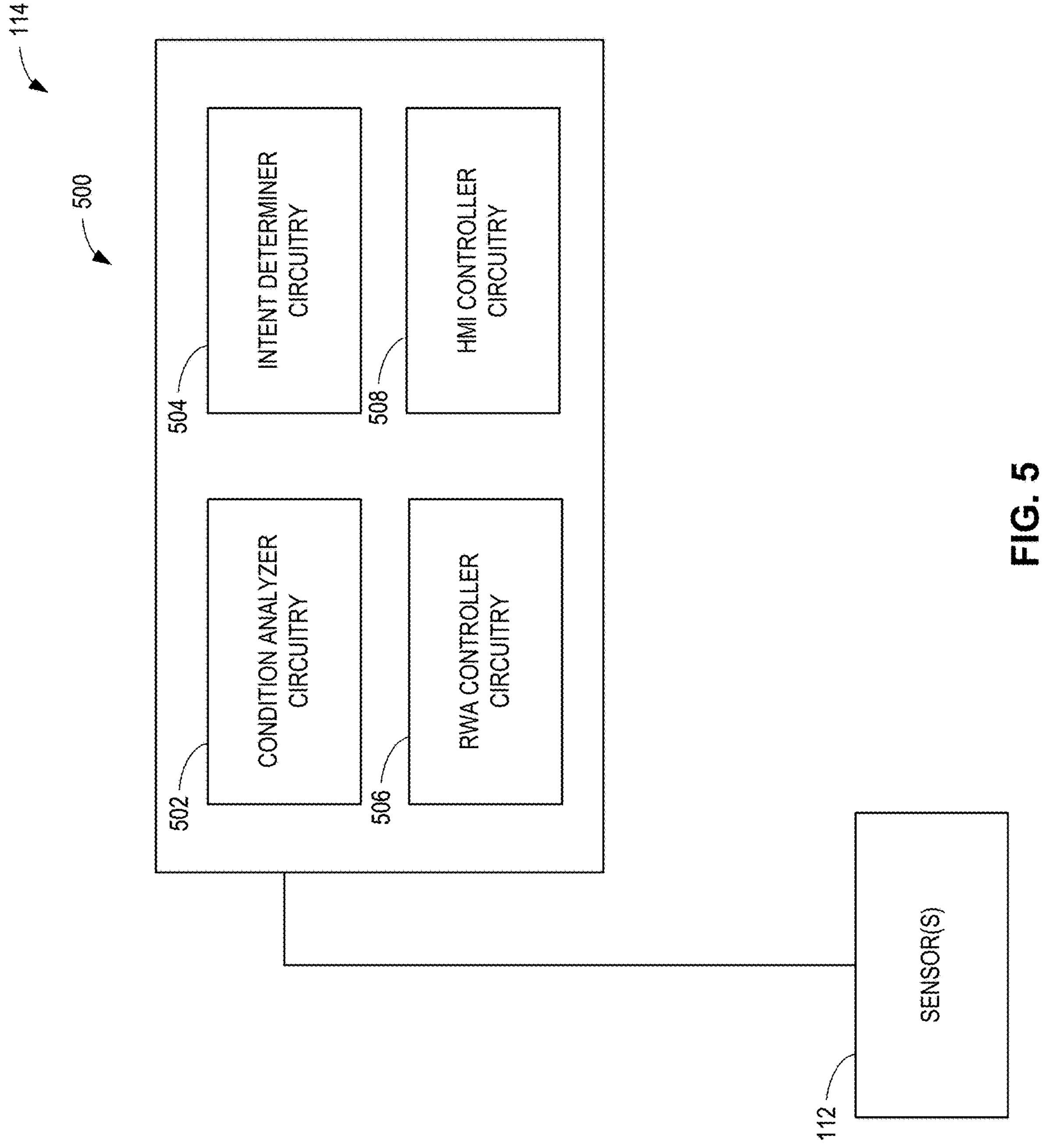
FIG. 5 is a block diagram of an example steering intent analysis system in accordance with teachings of this disclosure.

FIG. 5 is a block diagram of an example steering intent analysis system 500 to control operation of a steering system based on a predicted and/or determined intent of a user. The example steering intent analysis system 500 may be implemented in the steering controller 114 shown in FIGS. 1 and 2. The steering intent analysis system 500 of FIG. 5 may be instantiated (e.g., creating an instance of, bring into being for any length of time, materialize, implement, etc.) by programmable circuitry such as a Central Processor Unit (CPU) executing first instructions. Additionally or alternatively, the steering intent analysis system 500 of FIG. 5 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 5 may, thus, be instantiated at the same or different times. Some or all of the circuitry of FIG. 5 may be instantiated, for example, in one or more threads executing concurrently on hardware and/or in series on hardware. Moreover, in some examples, some or all of the circuitry of FIG. 5 may be implemented by microprocessor circuitry executing instructions and/or FPGA circuitry performing operations to implement one or more virtual machines and/or containers.

The steering intent analysis system 500 of the illustrated example includes example condition analyzer circuitry 502, example intent determiner circuitry 504, example RWA controller circuitry 506, and example HMI controller circuitry 508. According to examples disclosed herein, the steering intent analysis system 500 includes and/or is communicatively coupled to the sensor(s) 112.

The condition analyzer circuitry 502 of the illustrated example is utilized to determine and/or identify a condition of a vehicle (e.g., the vehicle 100) that utilizes a spring-to-center steering system. According to some examples disclosed herein, the condition analyzer circuitry 502 determines parameters of the vehicle, such as a speed of the vehicle, an acceleration/deceleration of the vehicle, whether the vehicle is being stopped, etc. In some examples, the condition analyzer circuitry 502 is instantiated by programmable circuitry executing condition analyzer instructions and/or configured to perform operations such as those represented by the flowchart of FIG. 6.

In this example, the intent determiner circuitry 504 predicts and/or determines an intent of a user of the vehicle. For example, the intent determiner circuitry 504 predicts whether the user intends to hold and/or maintain a steering assembly in a current position (e.g., a current angular position, a current steering angle/position, etc.). According to examples disclosed herein, the intent determiner circuitry 504 utilizes at least one condition of the vehicle to predict the intent. The condition can correspond to a speed of the vehicle, a degree to which the brake system is applied, a degree to which an accelerator is applied, whether the user has confirmed holding the steering angle, whether a switch corresponding to holding the steering angle is toggled, etc. In some examples, the intent determiner circuitry 504 is instantiated by programmable circuitry executing intent determiner instructions and/or configured to perform operations such as those represented by the flowchart of FIG. 6.

According to example disclosed herein, the RWA controller circuitry 506 controls an RWA associated with the steering system. In this example, the RWA controller circuitry 506 controls the RWA and, in turn, a steering assembly based on the predicted and/or determined intent. According to examples disclosed herein, the RWA can be controlled based on logic that can bypass spring-to-center behavior. In some examples, the RWA controller circuitry 506 is instantiated by programmable circuitry executing RWA controller instructions and/or configured to perform operations such as those represented by the flowchart of FIG. 6.

In this example, the HMI controller circuitry 508 is implemented to control and/or direct an HMI to convey information corresponding to a steering angle and/or whether the steering angle is being held to the user. The information may be conveyed visually or by tactile/haptic/vibrational feedback. Additionally or alternatively, the HMI controller circuitry 508 is utilized to prompt a user for input regarding whether to hold the steering angle. In some examples, the HMI controller circuitry 508 is instantiated by programmable circuitry executing display controller instructions and/or configured to perform operations such as those represented by the flowchart of FIG. 6.

While an example manner of implementing the steering intent analysis system 500 is illustrated in FIG. 5, one or more of the elements, processes, and/or devices illustrated in FIG. 5 may be combined, divided, re-arranged, omitted, eliminated, and/or implemented in any other way. Further, the example condition analyzer circuitry 502, the example intent determiner circuitry 504, the example RWA controller circuitry 506, and the example HMI controller circuitry 508, and/or, more generally, the example steering intent analysis system 500 of FIG. 5, may be implemented by hardware alone or by hardware in combination with software and/or firmware. Thus, for example, any of the example condition analyzer circuitry 502, the example intent determiner circuitry 504, the example RWA controller circuitry 506, and the example HMI controller circuitry 508, and/or, more generally, the example steering intent analysis system 500, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example steering intent analysis system 500 of FIG. 5 may include one or more elements, processes, and/or devices in addition to, or instead of, those illustrated in FIG. 5, and/or may include more than one of any or all of the illustrated elements, processes and devices.

Figure 6:
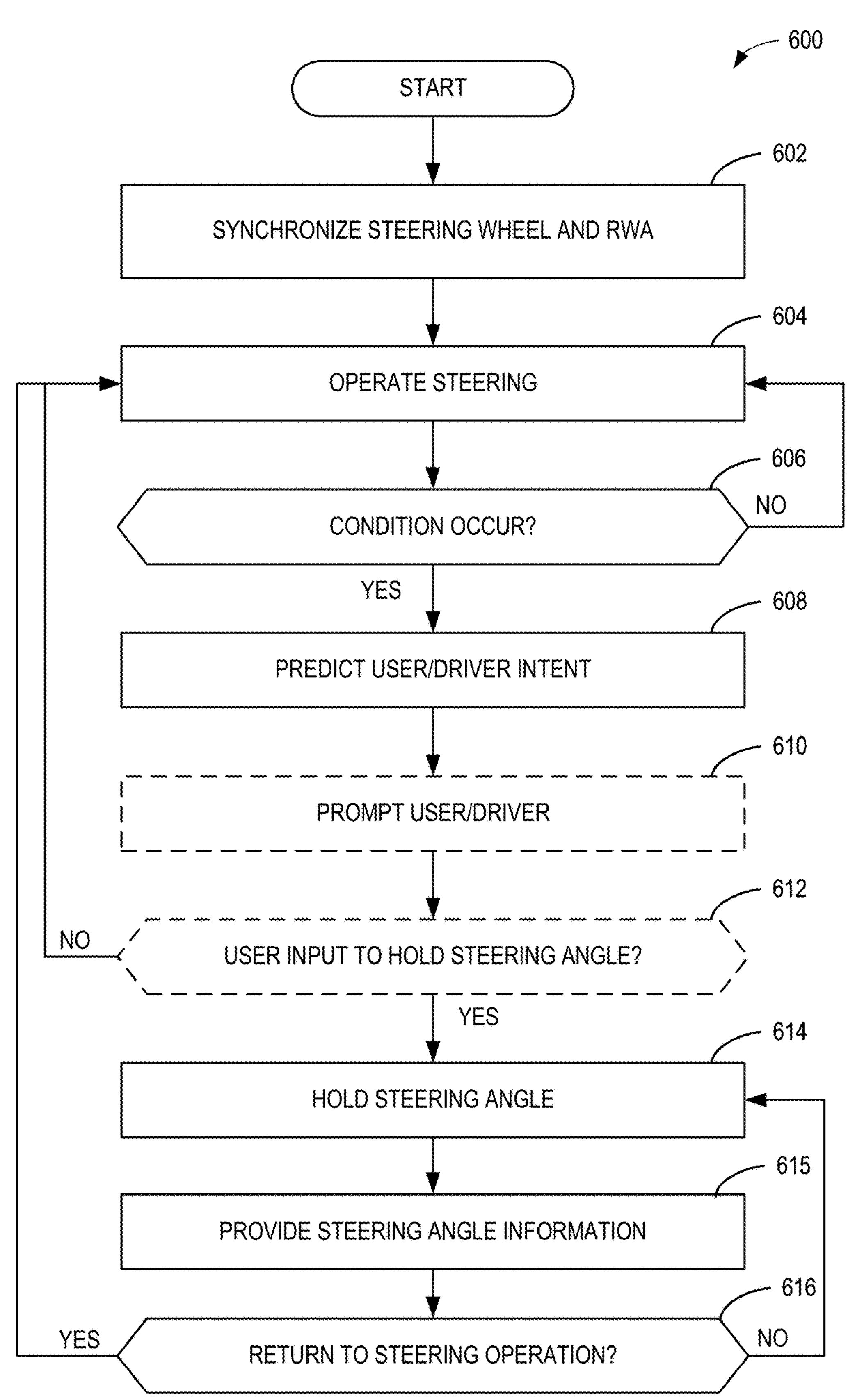
FIG. 6 is a flowchart representative of example machine readable instructions and/or example operations that may be executed, instantiated, and/or performed by example programmable circuitry to implement the steering intent analysis system of FIG. 5.

A flowchart representative of example machine readable instructions, which may be executed by programmable circuitry to implement and/or instantiate the steering intent analysis system 500 of FIG. 5 and/or representative of example operations which may be performed by programmable circuitry to implement and/or instantiate the steering intent analysis system 500 of FIG. 5, is shown in FIG. 6. The machine readable instructions may be one or more executable programs or portion(s) of one or more executable programs for execution by programmable circuitry such as the programmable circuitry 712 shown in the example processor platform 700 discussed below in connection with FIG. 7 and/or may be one or more function(s) or portion(s) of functions to be performed by programmable circuitry (e.g., an FPGA) discussed below in connection with FIGS. 8 and/or 9. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart illustrated in FIG. 6, many other methods of implementing the example steering intent analysis system 500 may alternatively be used. For example, the order of execution of the blocks of the flowchart may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C-Sharp, Perl, Python, JavaScript, HyperText Markup Language (HTML), Structured Query Language (SQL), Swift, Simulink (MBD), etc.

As mentioned above, the example operations of FIG. 6 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 6 is a flowchart representative of example machine readable instructions and/or example operations 600 that may be executed, instantiated, and/or performed by programmable circuitry to enable a user (e.g., a driver, an operator, etc.) to maintain steering wheels (e.g. front wheels) turned without holding the steering wheel, for example when coming to a step or when parallel parking on a steep grade with the steering wheels turned towards a curb. The example machine-readable instructions and/or the example operations 600 of FIG. 6 begin at block 602, at which the RWA controller circuitry 506 coordinates and/or controls operation of a spring-to-center steering wheel with respect to an RWA, both of which are part of a drive-by-wire steering system of a vehicle operated by the user.

At block 604, the RWA controller circuitry 506 operates the steering system of the vehicle. In this example, the RWA controller circuitry 506 operates the steering based on a model, such as a steering torque to RWA angle model. However, any other appropriate model can be implemented instead for coordinated operation of the steering wheel and the RWA. Accordingly, the steering wheel and the RWA operate in tandem to steer the vehicle as well as provide feedback (e.g., visual light emitting diode (LED) feedback) to the user.

At block 606, it is determined by the example condition analyzer circuitry 502 as to whether a condition associated with the vehicle has occurred. The condition can correspond to the vehicle speed, whether the vehicle is stopped, braking and/or acceleration/deceleration, etc. If the condition has occurred (block 606), control of the process proceeds to block 608. Otherwise, the process returns to block 604.

At block 608, the intent determiner circuitry 504 of the illustrated example predicts and/or determines an intent of a user of the vehicle. In this example, the intent determiner circuitry 504 utilizes a combination of detected vehicle conditions and/or parameters (e.g., vehicle speed, vehicle acceleration, etc.) to predict and/or determine the intent. Accordingly, the determined intent can correspond to overriding return-to-center behavior typical of steer-by-wire systems.

At block 610, in some examples, the user is prompted by an HMI directed by the HMI controller circuitry 508. In some such examples, the user is prompted as to whether to maintain and/or hold a steering angle of the RWA. In some examples, the user is prompted by blinking lights. Additionally or alternatively, the user is prompted based on vibrations and/or haptic signals and/or HMI prompts.

At block 612, in some examples, it is determined by the condition analyzer circuitry 502 and/or the HMI controller 508 as to whether the user has provided input for holding the steering angle of the RWA. For example, the condition analyzer circuitry 502 and/or the HMI controller 508 may determine whether the user has pushed and/or toggled a button, a switch, capacitive sensor or other input device. If the user input indicates holding and/or maintaining the steering angle (block 612), control of the process proceeds to block 614. Otherwise, the process returns to block 604.

At block 614, the steering angle of the RWA is held by the RWA controller circuitry 506. In this example, the steering angle is held based on determining and/or predicting an intent of the user such that the predicted intent corresponds to holding the steering angle. Accordingly, the holding of the steering angle by the RWA can override return-to-center behavior, which can be generally associated with spring-to-center steering systems.

At block 615, the HMI controller 508 controls the aforementioned HMI to indicate information corresponding to the steering angle. For example, the steering angle can be displayed to the user. Additionally or alternatively, an indication that the steering angle is being held and/or maintained is displayed on the HMI.

At block 616, the condition analyzer circuitry 502 and/or the intent determiner circuitry 504 determines whether to return the steering system to a normal operation (e.g., a model-based operation, a return-to center operation, etc.)). If it is determined to return the steering system to the normal operation (block 616), control of the process returns to block 604. Otherwise, the process returns to block 614. The determination may be based on whether the brake system is released, or a torque is reapplied to the steering torque sensor (e.g., the user applies a torque to the steering wheel subsequent to the steering torque sensor being released from a previously applied torque from the user).

Figure 7:
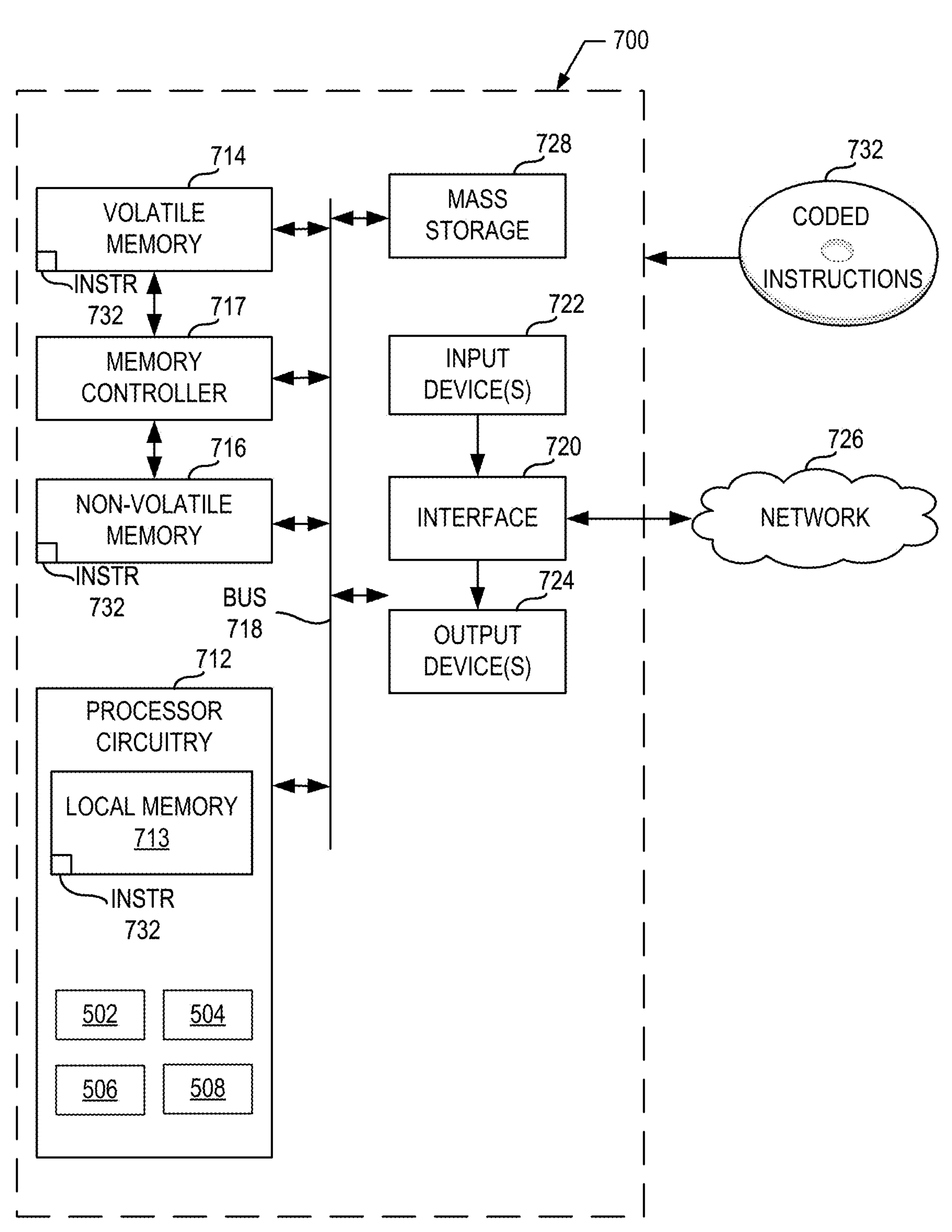
FIG. 7 is a block diagram of an example processing platform including programmable circuitry structured to execute, instantiate, and/or perform the example machine readable instructions and/or perform the example operations of FIG. 6 to implement the steering intent analysis system of FIG. 5.

FIG. 7 is a block diagram of an example programmable circuitry platform 700 structured to execute and/or instantiate the example machine-readable instructions and/or the example operations of FIG. 6 to implement the steering intent analysis system 500 of FIG. 5. The programmable circuitry platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 700 of the illustrated example includes programmable circuitry 712. The programmable circuitry 712 of the illustrated example is hardware. For example, the programmable circuitry 712 can be implemented by one or more integrated circuits, logic circuits, FPGAs, microprocessors, CPUs, GPUs, DSPs, and/ or microcontrollers from any desired family or manufacturer. The programmable circuitry 712 may be implemented by one or more semiconductor based (e.g., silicon based) devices. In this example, the programmable circuitry 712 implements the example condition analyzer circuitry 502, the example intent determiner circuitry 504, the example RWA controller circuitry 506, and the example HMI controller circuitry 508.

The programmable circuitry 712 of the illustrated example includes a local memory 713 (e.g., a cache, registers, etc.). The programmable circuitry 712 of the illustrated example is in communication with main memory 714, 716, which includes a volatile memory 714 and a non-volatile memory 716, by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717. In some examples, the memory controller 717 may be implemented by one or more integrated circuits, logic circuits, microcontrollers from any desired family or manufacturer, or any other type of circuitry to manage the flow of data going to and from the main memory 714, 716.

The programmable circuitry platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user (e.g., a human user, a machine user, etc.) to enter data and/or commands into the programmable circuitry 712. The input device(s) 722 can be implemented by, for example, an audio sensor, a microphone, a camera (still or video), a keyboard, a button, a mouse, a touchscreen, a trackpad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 700 of the illustrated example also includes one or more mass storage discs or devices 728 to store firmware, software, and/or data. Examples of such mass storage discs or devices 728 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 732, which may be implemented by the machine readable instructions of FIG. 6, may be stored in the mass storage device 728, in the volatile memory 714, in the non-volatile memory 716, and/or on at least one non-transitory computer readable storage medium such as a CD or DVD which may be removable.

Figure 8:
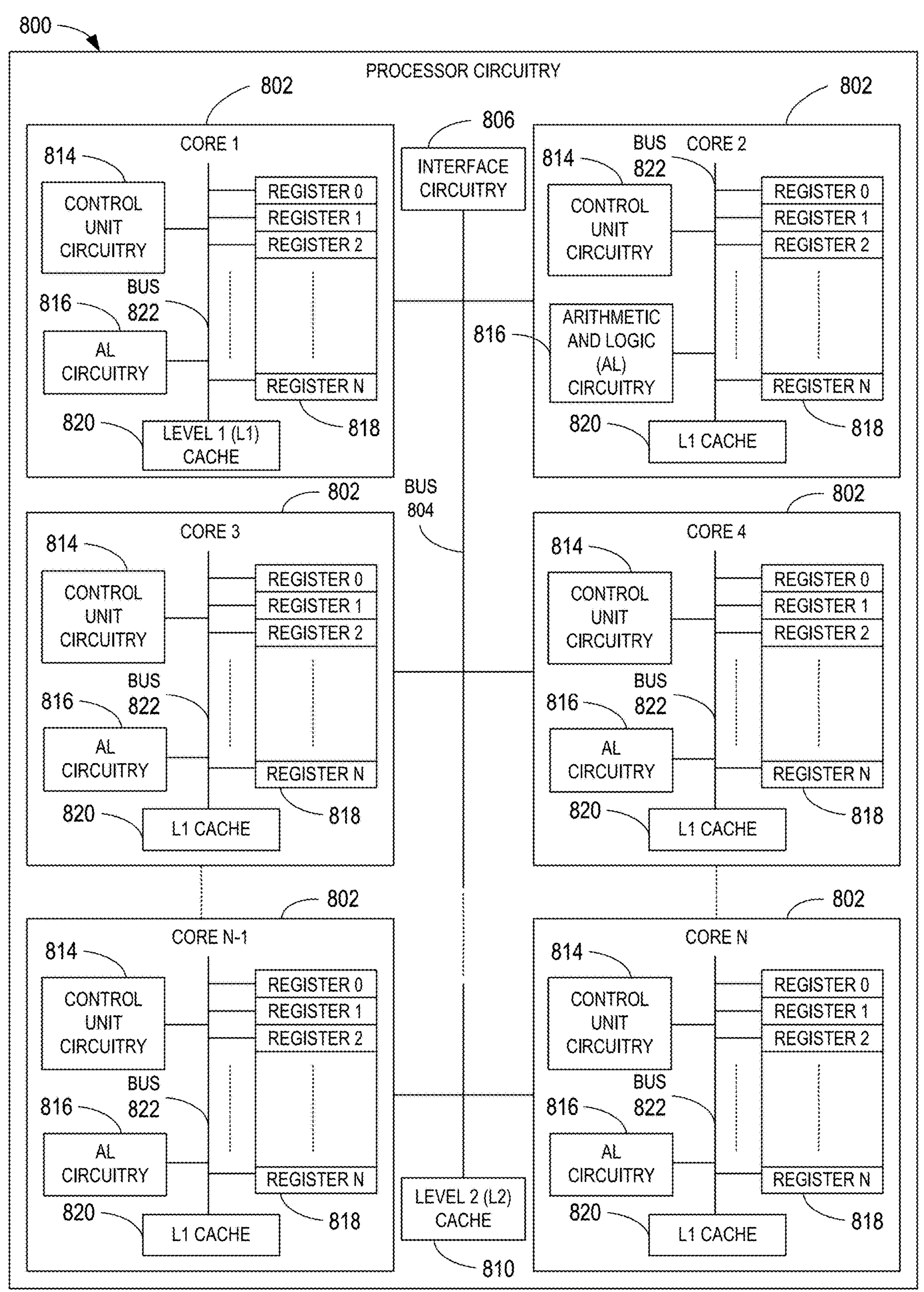
FIG. 8 is a block diagram of an example implementation of the programmable circuitry of FIG. 7.

FIG. 8 is a block diagram of an example implementation of the programmable circuitry 712 of FIG. 7. In this example, the programmable circuitry 712 of FIG. 7 is implemented by a microprocessor 800. For example, the microprocessor 800 may be a general-purpose microprocessor (e.g., general-purpose microprocessor circuitry). The microprocessor 800 executes some or all of the machine-readable instructions of the flowchart of FIG. 6 to effectively instantiate the circuitry of FIG. 5 as logic circuits to perform operations corresponding to those machine readable instructions. In some such examples, the circuitry of FIG. 5 is instantiated by the hardware circuits of the microprocessor 800 in combination with the machine-readable instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowchart of FIG. 6.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating-point operations. In yet other examples, the AL circuitry 816 may include first AL circuitry that performs integer-based operations and second AL circuitry that performs floating-point operations. In some examples, the AL circuitry 816 may be referred to as an Arithmetic Logic Unit (ALU).

The registers 818 are semiconductor-based structures to store data and/or instructions such as results of one or more of the operations performed by the AL circuitry 816 of the corresponding core 802. For example, the registers 818 may include vector register(s), SIMD register(s), general-purpose register(s), flag register(s), segment register(s), machine-specific register(s), instruction pointer register(s), control register(s), debug register(s), memory management register (s), machine check register(s), etc. The registers 818 may be arranged in a bank as shown in FIG. 8. Alternatively, the registers 818 may be organized in any other arrangement, format, or structure, such as by being distributed throughout the core 802 to shorten access time. The second bus 822 may be implemented by at least one of an I2C bus, a SPI bus, a PCI bus, or a PCIe bus.

Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages.

The microprocessor 800 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 800, in the same chip package as the microprocessor 800 and/or in one or more separate packages from the microprocessor 800.

Figure 9:
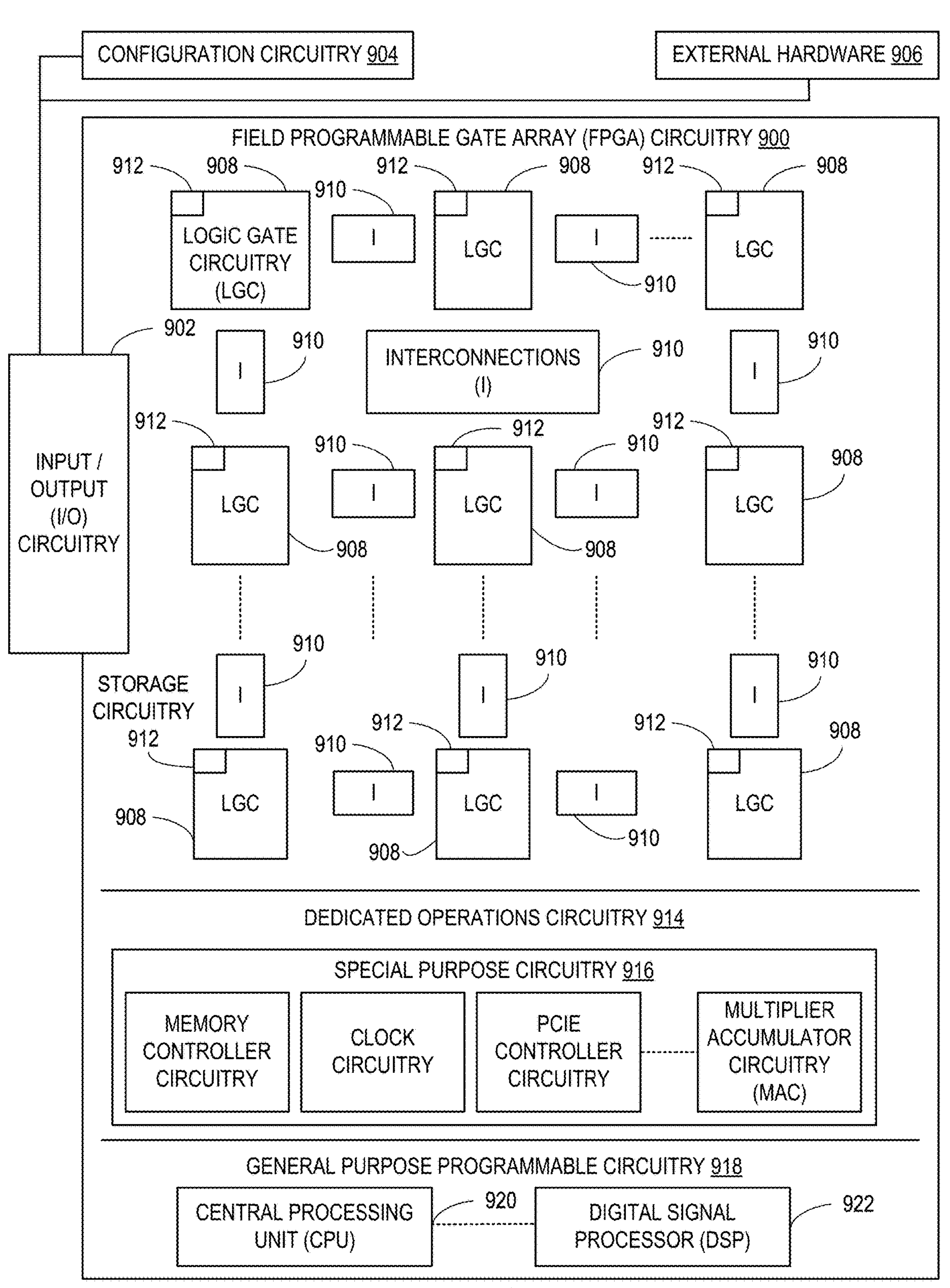
FIG. 9 is a block diagram of another example implementation of the programmable circuitry of FIG. 7.

FIG. 9 is a block diagram of another example implementation of the programmable circuitry 712 of FIG. 7. In this example, the programmable circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 800 of FIG. 8 described above (which is a general purpose device that may be programmed to execute some or all of the machine readable instructions represented by the flowchart of FIG. 6 but whose interconnections and logic circuitry are fixed once fabricated), the FPGA circuitry 900 of the example of FIG. 9 includes interconnections and logic circuitry that may be configured, structured, programmed, and/or interconnected in different ways after fabrication to instantiate, for example, some or all of the operations/functions corresponding to the machine readable instructions represented by the flowchart of FIG. 6. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the instructions (e.g., the software and/or firmware) represented by the flowchart of FIG. 6. As such, the FPGA circuitry 900 may be configured and/or structured to effectively instantiate some or all of the operations/functions corresponding to the machine readable instructions of the flowchart of FIG. 6 as dedicated logic circuits to perform the operations/functions corresponding to those software instructions in a dedicated manner analogous to an ASIC. Therefore, the FPGA circuitry 900 may perform the operations/functions corresponding to the some or all of the machine readable instructions of FIG. 6 faster than the general-purpose microprocessor can execute the same.

In the example of FIG. 9, the FPGA circuitry 900 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 900 of FIG. 9 may access and/or load the binary file to cause the FPGA circuitry 900 of FIG. 9 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 900 of FIG. 9 to cause configuration and/or structuring of the FPGA circuitry 900 of FIG. 9, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 900 of FIG. 9 may access and/or load the binary file to cause the FPGA circuitry 900 of FIG. 9 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 900 of FIG. 9 to cause configuration and/or structuring of the FPGA circuitry 900 of FIG. 9, or portion(s) thereof.

The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain a binary file, which may be implemented by a bit stream, data, and/or machine-readable instructions, to configure the FPGA circuitry 900, or portion(s) thereof. In some such examples, the configuration circuitry 904 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 906 may be implemented by external hardware circuitry. For example, the external hardware 906 may be implemented by the microprocessor 800 of FIG. 8.

The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations/functions that may correspond to at least some of the machine readable instructions of FIG. 6 and/or other desired operations. The logic gate circuitry 908 shown in FIG. 9 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations/functions. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example dedicated operations circuitry 914. In this example, the dedicated operations circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the programmable circuitry 712 of FIG. 7, many other approaches are contemplated. For example, FPGA circuitry may include an on-board CPU, such as one or more of the example CPU 920 of FIG. 8. Therefore, the programmable circuitry 712 of FIG. 7 may additionally be implemented by combining at least the example microprocessor 800 of FIG. 8 and the example FPGA circuitry 900 of FIG. 9. In some such hybrid examples, one or more cores 802 of FIG. 8 may execute a first portion of the machine readable instructions represented by the flowchart of FIG. 6 to perform first operation(s)/function(s), the FPGA circuitry 900 of FIG. 9 may be configured and/or structured to perform second operation(s)/function(s) corresponding to a second portion of the machine readable instructions represented by the flowchart of FIG. 6, and/or an ASIC may be configured and/or structured to perform third operation(s)/function(s) corresponding to a third portion of the machine readable instructions represented by the flowchart of FIG. 6.

It should be understood that some or all of the circuitry of FIG. 5 may, thus, be instantiated at the same or different times. For example, same and/or different portion(s) of the microprocessor 800 of FIG. 8 may be programmed to execute portion(s) of machine-readable instructions at the same and/or different times. In some examples, same and/or different portion(s) of the FPGA circuitry 900 of FIG. 9 may be configured and/or structured to perform operations/functions corresponding to portion(s) of machine-readable instructions at the same and/or different times.

In some examples, some or all of the circuitry of FIG. 5 may be instantiated, for example, in one or more threads executing concurrently and/or in series. For example, the microprocessor 800 of FIG. 8 may execute machine readable instructions in one or more threads executing concurrently and/or in series. In some examples, the FPGA circuitry 900 of FIG. 9 may be configured and/or structured to carry out operations/functions concurrently and/or in series. Moreover, in some examples, some or all of the circuitry of FIG. 5 may be implemented within one or more virtual machines and/or containers executing on the microprocessor 800 of FIG. 8.

In some examples, the programmable circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the programmable circuitry 712 of FIG. 7, which may be in one or more packages. For example, the XPU may include a CPU (e.g., the microprocessor 800 of FIG. 8, the CPU 920 of FIG. 9, etc.) in one package, a DSP (e.g., the DSP 922 of FIG. 9) in another package, a GPU in yet another package, and an FPGA (e.g., the FPGA circuitry 900 of FIG. 9) in still yet another package.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

Notwithstanding the foregoing, in the case of referencing a semiconductor device (e.g., a transistor), a semiconductor die containing a semiconductor device, and/or an integrated circuit (IC) package containing a semiconductor die during fabrication or manufacturing, "above" is not with reference to Earth, but instead is with reference to an underlying substrate on which relevant components are fabricated, assembled, mounted, supported, or otherwise provided. Thus, as used herein and unless otherwise stated or implied from the context, a first component within a semiconductor die (e.g., a transistor or other semiconductor device) is "above" a second component within the semiconductor die when the first component is farther away from a substrate (e.g., a semiconductor wafer) during fabrication/manufacturing than the second component on which the two components are fabricated or otherwise provided. Similarly, unless otherwise stated or implied from the context, a first component within an IC package (e.g., a semiconductor die) is "above" a second component within the IC package during fabrication when the first component is farther away from a printed circuit board (PCB) to which the IC package is to be mounted or attached. It is to be understood that semiconductor devices are often used in orientation different than their orientation during fabrication. Thus, when referring to a semiconductor device (e.g., a transistor), a semiconductor die containing a semiconductor device, and/or an integrated circuit (IC) package containing a semiconductor die during use, the definition of "above" in the preceding paragraph (i.e., the term "above" describes the relationship of two parts relative to Earth) will likely govern based on the usage context.

As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein, "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein, integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

Example methods, apparatus, systems, and articles of manufacture to enable enhanced utilization of steer-by-wire systems are disclosed herein. Further examples and combinations thereof include the following:

Example 1 includes an apparatus comprising interface circuitry communicatively coupled to a road wheel actuator (RWA) and a steering torque sensor corresponding to a spring-to-center steering wheel of a vehicle, machine-readable instructions, and at least one processor circuit to be programmed by the machine-readable instructions to determine that the vehicle is moving at or below a threshold speed and a brake of the vehicle is being applied, and maintain, based on the determination, a steering angle of the RWA when a degree of torque applied to the steering torque sensor is less than or equal to a threshold degree of torque.

Example 2 includes the apparatus as defined in example 1, wherein one or more of the at least one processor circuit is to cause a human-machine interface (HMI) to display information corresponding to the steering angle.

Example 3 includes the apparatus as defined in any one or more of examples 1 or 2, wherein the HMI includes an array of linearly arranged light sources.

Example 4 includes the apparatus as defined in any one or more of examples 1 to 3, wherein one or more of the at least one processor circuit is to determine that a torque is applied to the steering wheel and has been released to maintain the steering angle.

Example 5 includes the apparatus as defined in any one or more of examples 1 to 4, wherein the steering angle is maintained by preventing a return-to-center movement of the RWA.

Example 6 includes the apparatus as defined as defined in any one or more of examples 1 to 5, wherein one or more of the at least one processor circuit is to cause an HMI to prompt a user of the vehicle to select whether to maintain the steering angle, and wherein the steering angle is maintained in response to an input of the user.

Example 7 includes the apparatus as defined in any one or more of examples 1 to 6, wherein the input corresponds to toggling a switch or button to confirm that the steering angle is to be maintained.

Example 8 includes the apparatus as defined in any one or more of examples 1 to 7, wherein one or more of the at least one processor circuit is to cause the RWA to cease maintaining the steering angle in response to at least one of the brake being released or torque being applied to the steering torque sensor.

Example 9 includes at least one non-transitory machine-readable medium comprising machine-readable instructions to cause at least one processor circuit to at least predict an intent of a user of a vehicle at least partially based on (i) a speed of the vehicle, and (ii) an application of a brake, hold a steering angle of a road wheel actuator (RWA) based on the predicted intent indicating to hold the steering angle when a degree of torque applied to a steering torque sensor of a spring-to-center steering wheel is released, and cause a human machine interface (HMI) to display information corresponding to the steering angle as the steering angle is held.

Example 10 includes the at least one non-transitory machine-readable medium as defined in example 9, wherein the machine-readable instructions are to cause one or more of the at least one processor circuit to cause the HMI to prompt the user of the vehicle to select whether to hold the steering angle, and wherein the steering angle is held in response to an input from the user.

Example 11 includes the at least one non-transitory machine-readable medium as defined in any one or more of examples 9 or 10, wherein the input from the user corresponds to toggling a button or a switch on a steering wheel.

Example 12 includes the at least one non-transitory machine-readable medium as defined in any one or more of examples 9 to 11, wherein the machine-readable instructions are to cause one or more of the at least one processor circuit to cause the human machine interface (HMI) to display information indicating that the steering angle is being held.

Example 13 includes the at least one non-transitory machine-readable medium as defined in any one or more of examples 9 to 12, wherein the machine-readable instructions are to cause one or more of the at least one processor circuit to cause the HMI to illuminate at least one light source of a linearly arranged light array based on the steering angle.

Example 14 includes the at least one non-transitory machine-readable medium as defined in any one or more of examples 9 to 13, wherein the machine-readable instructions are to cause the RWA to cease holding the steering angle in response to at least one of the brake being released or torque being applied to the steering torque sensor.

Example 15 includes the at least one non-transitory machine-readable medium as defined in any one or more of examples 9 to 14, wherein the intent is predicted based on the vehicle speed being stopped and a degree to which the brake system is applied.

Example 16 includes a method of operating a steer-by wire system of a vehicle, the method comprising determining, by executing instructions with at least one processor, that (i) the vehicle is travelling at or below a threshold speed, and (ii) a brake of the vehicle is being applied, and maintaining, by executing instructions with the at least one processor, the steering angle of a RWA based on the determination and a degree of torque applied to a steering torque sensor being less than or equal to a threshold degree of torque.

Example 17 includes the method as defined in example 16, further including providing, by executing instructions with the at least one processor, a prompt to a user of the vehicle to select whether to maintain the steering angle, and wherein the steering angle is maintained in response to an input corresponding to the user.

Example 18 includes the method as defined in any one or more of examples 16 or 17, further including causing, by executing instructions with the at least one processor, a human-machine interface (HMI) to display information corresponding to the steering angle.

Example 19 includes the method as defined in any one or more of examples 16 to 18, further including enabling, by executing instructions with the at least one processor, an adjustment of the steering angle in response to at least one of the brake being released or torque being applied to the steering torque sensor.

Example 20 includes the method as defined in any one or more of examples 16 to 19, wherein the determination corresponds to the vehicle being at a standstill with the brake applied.

From the foregoing, it will be appreciated that example systems, apparatus, articles of manufacture, and methods have been disclosed that enable an enhanced user experience for users of steer-by-wire systems. Disclosed systems, apparatus, articles of manufacture, and methods improve the efficiency of using a computing device by predicting user intent in a computationally efficient manner that does not necessitate extensive hardware and software, as in known systems. Disclosed systems, apparatus, articles of manufacture, and methods are accordingly directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:

interface circuitry communicatively coupled to a road wheel actuator (RWA) and a steering torque sensor corresponding to a spring-to-center steering wheel of a vehicle;

machine-readable instructions; and at least one processor circuit to be programmed by the machine-readable instructions to:

determine that the vehicle is moving at or below a threshold speed and a brake of the vehicle is being applied; and maintain, based on the determination, a steering angle of the RWA when a degree of torque applied to the steering torque sensor is less than or equal to a threshold degree of torque.

2. The apparatus as defined in claim 1, wherein one or more of the at least one processor circuit is to cause a human-machine interface (HMI) to display information corresponding to the steering angle.

3. The apparatus as defined in claim 2, wherein the HMI includes an array of linearly arranged light sources.

4. The apparatus as defined in claim 1, wherein one or more of the at least one processor circuit is to determine that a torque is applied to the steering wheel and has been released to maintain the steering angle.

5. The apparatus as defined in claim 1, wherein the steering angle is maintained by preventing a return-to-center movement of the RWA.

6. The apparatus as defined in claim 1, wherein one or more of the at least one processor circuit is to cause an HMI to prompt a user of the vehicle to select whether to maintain the steering angle, and wherein the steering angle is maintained in response to an input of the user.

7. The apparatus as defined in claim 5, wherein the input corresponds to toggling a switch or button to confirm that the steering angle is to be maintained.

8. The apparatus as defined in claim 1, wherein one or more of the at least one processor circuit is to cause the RWA to cease maintaining the steering angle in response to at least one of the brake being released or torque being applied to the steering torque sensor.

9. At least one non-transitory machine-readable medium comprising machine-readable instructions to cause at least one processor circuit to at least:

predict an intent of a user of a vehicle at least partially based on: (i) a speed of the vehicle, and (ii) an application of a brake;

hold a steering angle of a road wheel actuator (RWA) based on the predicted intent indicating to hold the steering angle when a degree of torque applied to a steering torque sensor of a spring-to-center steering wheel is released; and cause a human machine interface (HMI) to display information corresponding to the steering angle as the steering angle is held.

10. The at least one non-transitory machine-readable medium as defined in claim 9, wherein the machine-readable instructions are to cause one or more of the at least one processor circuit to cause the HMI to prompt the user of the vehicle to select whether to hold the steering angle, and wherein the steering angle is held in response to an input from the user.

11. The at least one non-transitory machine-readable medium as defined in claim 10, wherein the input from the user corresponds to toggling a button or a switch on a steering wheel.

12. The at least one non-transitory machine-readable medium as defined in claim 9, wherein the machine-readable instructions are to cause one or more of the at least one processor circuit to cause the human machine interface (HMI) to display information indicating that the steering angle is being held.

13. The at least one non-transitory machine-readable medium as defined in claim 9, wherein the machine-readable instructions are to cause one or more of the at least one processor circuit to cause the HMI to illuminate at least one light source of a linearly arranged light array based on the steering angle.

14. The at least one non-transitory machine-readable medium as defined in claim 9, wherein the machine-readable instructions are to cause the RWA to cease holding the steering angle in response to at least one of the brake being released or torque being applied to the steering torque sensor.

15. The at least one non-transitory machine-readable medium as defined in claim 9, wherein the intent is predicted based on the vehicle speed being stopped and a degree to which the brake system is applied.

16. A method of operating a steer-by wire system of a vehicle, the method comprising:

determining, by executing instructions with at least one processor, that (i) the vehicle is travelling at or below a threshold speed, and (ii) a brake of the vehicle is being applied; and maintaining, by executing instructions with the at least one processor, the steering angle of a RWA based on the determination and a degree of torque applied to a steering torque sensor being less than or equal to a threshold degree of torque.

17. The method as defined in claim 16, further including providing, by executing instructions with the at least one processor, a prompt to a user of the vehicle to select whether to maintain the steering angle, and wherein the steering angle is maintained in response to an input corresponding to the user.

18. The method as defined in claim 16, further including causing, by executing instructions with the at least one processor, a human-machine interface (HMI) to display information corresponding to the steering angle.

19. The method as defined in claim 16, further including enabling, by executing instructions with the at least one processor, an adjustment of the steering angle in response to at least one of the brake being released or torque being applied to the steering torque sensor.

20. The method as defined in claim 16, wherein the determination corresponds to the vehicle being at a standstill with the brake applied.

* * * * *